United States Patent [19]

Double et al.

[11] Patent Number: 4,780,141
[45] Date of Patent: Oct. 25, 1988

[54] CEMENTITIOUS COMPOSITE MATERIAL CONTAINING METAL FIBER

[75] Inventors: David D. Double, Annapolis; Sean Wise, Millersville, both of Md.

[73] Assignee: CEMCOM Corporation, Lanham, Md.

[21] Appl. No.: 945,632

[22] Filed: Dec. 23, 1986

Related U.S. Application Data

[63] Continuation-in-part of Ser. No. 894,815, Aug. 8, 1986.

[51] Int. Cl.$^4$ ............................ C04B 14/48; B28B 7/34
[52] U.S. Cl. ................................. 106/38.3; 106/38.35; 106/85; 106/97; 106/98; 106/99
[58] Field of Search ....................... 106/97, 99, 98, 85, 106/38.3, 38.35

[56] References Cited

U.S. PATENT DOCUMENTS

| | | | |
|---|---|---|---|
| 2,463,561 | 3/1949 | Riley | 106/99 |
| 4,257,912 | 3/1981 | Fleischer et al. | 106/99 |
| 4,482,385 | 11/1984 | Satkowski et al. | 106/97 |
| 4,501,830 | 2/1985 | Miller et al. | 106/97 |
| 4,593,627 | 6/1986 | Lankard et al. | 106/99 |
| 4,666,520 | 5/1987 | Bright et al. | 106/97 |

FOREIGN PATENT DOCUMENTS

| | | | |
|---|---|---|---|
| 0150002 | 7/1985 | European Pat. Off. | |
| 57-48499 | 10/1982 | Japan | 106/99 |
| 2154227 | 9/1985 | United Kingdom | 106/99 |

*Primary Examiner*—Steven Capella
*Attorney, Agent, or Firm*—James F. Tao; James F. Mudd

[57] ABSTRACT

Cementitious composite materials having high strength, vacuum integrity, good thermal properties and low coefficient of thermal expansion are prepared from a mixture of
(1) a high strength cement matrix, and
(2) a filler component, comprising a metal fiber.

These composites are useful in the manufacture of molds and tools for forming metals and plastics. A preferred composite mixture comprising Portland cement, chemically reactive silica particles, inorganic oxide particles, a cement superplasticizer, an irregularly shaped aggregate, metal fibers, and water. The mixtures preferably contain chemically reactive silica fume particles and reactive silica particles such as crystalline silica or quartz particles or a vitreous/glassy form of silicon. The mixtures preferably comprise stainless steel fibers and stainless steel aggregate. High nickel steel and silicon carbide can be used as aggregate in applications requiring low coefficient of thermal expansion.

60 Claims, No Drawings

CEMENTITIOUS COMPOSITE MATERIAL CONTAINING METAL FIBER

REFERENCE TO PRIOR APPLICATION

This is a continuation-in-part of copending application Ser. No. 894,815, filed Aug. 8, 1986 pending.

BACKGROUND OF THE INVENTION AND INFORMATION DISCLOSURE STATEMENT

This invention is directed to new cementitious composite materials exhibiting unique combinations of properties. More particularly, it relates to composites with unusually high strength, vacuum integrity and thermal properties not found in previously known cementitious composite materials.

PCT publication WO 80/00959, published May 18, 1980, discloses a cementitious product comprising Portland cement, silica dust, sands such as quartz and granite, a cement superplasticizer and water. This publication discloses the addition of particles to densify the Portland cement, but did not disclose the concept of involving the additives in a pozzolanic reaction.

U.S. Pat. No. 4,505,753 discloses a cementitious composite material comprising Portland cement, finely divided silica fillers, a superplasticizer, water and optionally an antifoaming agent. This material has unusually high strength characteristics as compared to standard cements.

U.S. Pat. No. 4,482,385 discloses still another cementitious composite material comprising Portland cement, finely divided silica fillers, a superplasticizer, water, a foaming agent and irregularly shaped stainless steel particles. The latter composite material has not only unusual strength characteristics, but also vacuum integrity and unusual thermal properties.

Copending application Ser. No. 894,815, filed Aug. 8, 1986, discloses that metal fibers can be combined with the cements of the above-numbered patents to provide friction compositions, but the copending application does not disclose the improved properties found with the compositions of this invention.

The use of steel fibers to reinforce concrete has been disclosed such as in "New Swedish Technology", Volume 5, No. 3 (1986). But the steel fibers are relatively long, having lengths up to 30-40 millimeters. Fiber reinforced concrete is also disclosed in Fibre Cements and Fibre Concrete, by D. J. Hannant (1978) John Wiley & Sons.

One object of the invention is to provide a cementitious composition which is capable of sustaining a vacuum even at elevated temperatures, and which therefore has particular utility when cast as an article intended to be used as a mold in a process involving the use of the mold in a vacuum environment.

A further object of the invention is to provide a cementitious composite material which has unusually high strength at high temperatures, such as 400 degrees Celsius and higher.

Another object of the invention is to provide a cementitious composite material which has good thermal properties that can be adjusted to specific requirements. For example, one of the major applications for the materials of the invention is in the manufacture of molds and tools useful for metal and plastic forming. In such applications, it is often desirable to match the thermal expansion of the mold or tool with that of the part which is being fabricated. Also, the tool may require fittings, such as a steel mold base, a heating manifold, and the like. In such cases, matched coefficients of thermal expansion are also desirable. Typically, it is desired to control the coefficient of thermal expansion from about 0 to about $15 \times 10^{-6}$ per degree F.

SUMMARY OF THE INVENTION

These and other objects of this invention are accomplished by a composite material comprising (1) a high strength cement matrix, and (2) a filler component comprising a metal fiber. More specifically, the invention is a composite material which is produced from a mixture including the following components:
  (a) a cement component,
  (b) a chemically reactive silica,
  (c) an inorganic oxide,
  (d) a filler component comprising a metal fiber, and
  (e) water.

The preferred cement is a silica based cement, such as Portland cement. A preferred inorganic oxide is silica. Generally, an aggregate, such as a metal aggregate, is also included in the filler component. It is customary to incorporate a superplasticizer of the kind normally known for use in cement compositions.

It has been found that the desired combination of properties is generally obtained from cement mixtures reacting to form a tobermorite-like gel, and which are characterized by the absence of a continuous network of interconnected macroscopically visible pores.

DESCRIPTION OF PREFERRED EMBODIMENTS

In the description which follows, there are described specific formulations of materials with unique combinations of properties, but it is to be understood that the description is presented by way of illustration and is not intended to be construed as limiting the invention in any way.

(1) Cement Matrix Materials

In accordance with the present invention, a high strength cement is a cement which in the final cured composite exhibits a flexural strength of at least about 1500 psi, and a compressive strength of at least about 15,000 psi.

A wide variety of inorganic cements may be used to develop the high strength matrix material in the composites of the present invention. The matrix materials can be based on one or more of the following cements:
  1. silica based cements, e.g., Portland cements,
  2. high alumina cements,
  3. polymer treated cements (polymer modified cements, polymer impregnated cements),
  4. Other mixtures of cement forming ceramic oxides, e.g., lime, silica, alumina, magnesia, phosphate; and
  5. phosphate based cements.

High strength cements suitable for the present invention and their preparation are described in the following U.S. Pat. Nos. 4,353,748, 4,410,366, 4,482,385, 4,501,830 and 4,505,753, the disclosures of which are incorporated herein by reference, and in numerous other patents and publications.

In addition to cements such as Portland cement or high alumina cement, the matrix material may include the additives disclosed in the five above-noted U.S. patents. For example, as described in U.S. Pat. No. 4,505,753, the cement is preferably class H Portland cement, mixed with a crystalline form of silicon dioxide of a general size of finer than 5 microns, silica fume and a superplasticizer. U.S. Pat. No. 4,482,385 describes a matrix comprising class H Portland cement, Min-U-Sil silica particles, silica fume and a superplasticizer. A stainless steel aggregate is also employed. As described in U.S. Pat. No. 4,410,366, the cement is a high alumina cement and a water dispersable or water soluble polymer or copolymer. Preferred proportions of components are disclosed in these patents.

The matrix materials useful in this invention also include the phosphate bonded matrix which may comprise the following:

|  | Weight Percent |
| --- | --- |
| Alumina Cement | 25–75 |
| Calcined Alumina | 8–35 |
| Sodium Hexametaphosphate | 8–25 |
| Magnesium Oxide | 0–66 |
| Water | 8–25 |

More specifically, useful matrix components include the following components in the indicated proportions:

|  | Broad | Narrow |
| --- | --- | --- |
| Class H Portland Cement | 0–40 | 15–35 |
| Alumina Cement | 0–50 | 20–45 |
| Min-U-Sil Silica Particles | 0–25 | 10–20 |
| Fused Silica Particles | 0–25 | 10–20 |
| Silica Fume | 0–10 | 3–7 |
| Calcined Alumina | 0–30 | 4–20 |
| Magnesium Oxide | 0–50 | 10–50 |
| Wollastonite | 0–50 | 20–30 |
| Sodium Hexametaphosphate | 0–25 | 10–20 |
| Polyvinyl Alcohol/Acetate | 0–25 | 4–17 |
| Polyethyleneimine | 0–5 | 0.5–2 |
| Polyvinylpyrrolidone | 0–10 | 2–7 |
| Superplasticizer (e.g., Mighty 100 or 150) | 0–3 | 0.2–2 |
| Acrylic Polymer Latex (solids content) | 0–5 | 1–5 |
| Water | 2–20 | 5–15 |

The total proportion of matrix generally comprises about 30 to about 70 weight percent of the composite, usually about 40 to about 50 weight percent.

A preferred high strength cement matrix composition of the invention comprises:
(a) Portland cement,
(b) chemically reactive silica,
(c) inorganic oxide,
(d) superplasticizer, and
(e) water.

To the foregoing matrix composition is added (2) a reinforcing filler component which contains a metal fiber, to form the composite material of the invention. The filler component preferably also contains an aggregate, more usually a metal aggregate, such as stainless steel. Detailed disclosure of the foregoing components follows.

(a) Portland Cement

It appears that any of the various grades of Portland Cement which are commercially available are suitable for the production of the material of this invention. However, Type III Portland Cement is preferred and the Portland Cement known as API Class H is particularly preferred. Class H is a coarse grind of Portland Cements.

The cement component comprises about 20 to 35 percent by weight of the composite material, about 24 to 26 percent being particularly preferred.

(b) Chemically Reactive Silica

The chemically reactive silica used in the mixture which produces the cementitious composite material of this invention is preferably an amorphous, non-crystalline, pozzolanic silicon dioxide and is preferably condensed silica fume.

This constituent is believed to have pozzolanic properties in the present composition. Thus, although in itself it possesses little or no cementitious value, it will, at ordinary temperatures, in the presence of moisture, chemically react with calcium compounds to form compounds possessing cementitious properties. Two such possible reactions involving the finely divided silica fume and leading to the production of silicate mineral phases such as tobermorite might be the following:

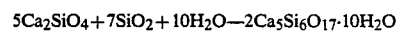

Condensed silica fume is produced as a by-product in the electric arc furnace production of silicon or silicon alloys such as ferrosilicon. The gases which are evolved during manufacture of ferrosilicon from quartz, coke and iron ore when they are heated to up to about 2000° C. contain Si and SiO vapors which form $SiO_2$ when they react with air as they emerge from the furnace. These vapors condense and the very tiny spherical particles which result from condensation of the vapors are almost entirely amorphous silica with 20–25 m²/g surface area. Typically, the particles analyze 85–92% $SiO_2$, up to 3% $Fe_2O_3$, 1–3% alkali metal oxides, 1–2% C, and the remainder being small amounts of alumina, lime and magnesia. The particles range from 0.01 to 0.3 micron with about 70% being smaller than 0.1 micron. This material is also described in U.S. Pat. No. 4,321,243, issued Mar. 23, 1982.

The use of silica fume in the mixture confers additional benefits. Because it is so finely divided, it helps to fill any interstital voids in the mixture and because it is chemically reactive it reacts with any $Ca(OH)_2$ present, which forms from the hydrolysis of calcium silicates in the Portland Cement, and therefore counteracts the known deleterious effects which are produced when free $Ca(OH)_2$ or free CaO are present in cements.

The chemically reactive silica generally has a particle size in the range of less than 1 micron, preferably about 0.1 to 1 micron. The amount of chemically active silica in the mixture should be between about 2 and 10 percent by weight. About 3 to 4 percent is the preferred amount.

(c) Inorganic Oxides

In addition to the chemically reactive silica described above, other inorganic oxides that differ from the chemically reactive silica can also be employed in the composition of the invention. These oxides are generally larger in particle size than the chemically reactive silica. These oxides do not necessarily exhibit pozzolanic properties. At elevated temperatures, however, they may show some reaction later during the curing cycle of the composition of the invention. A preferred inorganic oxide is silica.

A typical silica is a fused silica such as a vitreous/glassy form of silica ($SiO_2$) manufactured by fine grinding of fused material. Particle size is generally less than about 50 microns.

Another silica is a finely divided, crystalline silica or quartz known as Min-U-Sil, which has a particle size of about 2 to 5 microns.

Other metal oxides include alumina, zirconia, mullite, eucryptite, cordierite, and the like.

The metal oxides generally have a particle size of less than about 50 microns. The metal oxides are employed in a proportion of about 5 to 30 weight percent of the mixture, preferably about 10 to 20 weight percent, still more preferably about 10 to 12 weight percent.

(d) Superplasticizer

To make the final mixture more fluid and to permit better wetting and mixing, a superplasticizer known for use in cement compositions can be included in the composition of the invention. The preferred plasticizer is sold as Mighty 100 or Mighty 150, the active ingredient of which is the sodium salt of formaldehyde condensate of naphthalene beta-sulfonic acid. Mighty 100 is available as a powder. Mighty 150 is available as a liquid. While it is not intended to be bound by any theoretical explanation, it is believed that the superplasticizer affects the zeta potential of the mixture and prevents flocculation thereby permitting the use of smaller amounts of water and increasing the strength of the product. Other known plasticizers or superplasticizers may be used in place of Mighty 100 or Mighty 150 to disperse the fine powders in the mixture. Amounts between 0.01 and 3.0% by weight are beneficial and a particularly preferred amount is about 0.25 to 0.8% by weight.

(e) Water

Water, preferably distilled water, is an important constituent of the mixture required to produce the high strength composite of this invention. In order to obtain a product with the desired properties about 5 to 10 percent of water is added, the preferred amount being about 6 to 8 percent.

(f) Antifoaming Agent

The composite produced from the above admixture may be improved by the incorporation of an antifoaming agent. Tri-n-butyl phosphate is a typical additive. The purpose of this component is to reduce the amount and size of air pockets created or trapped in the final cementitious composite material which would decrease the physical properties. The amount of antifoam agent in the mixture should be between 0.01 and 0.5 percent by weight, if one is employed.

(g) Other Additives

Various other additives can be employed in the composition of the invention. For example, various polymeric additives can be employed to modify the properties of the composites of the invention. Such polymeric additives include acrylic polymers; elastomeric polymers, such as styrene-butadiene rubber, and vinyl polymers such as polyvinyl acetate. The polymeric additives can be employed in proportions up to about 5 weight percent of the composite material, based on the solids content of the polymer component, preferably about 1 to about 5 weight percent.

(2) Filler Component

(a) Fiber

A novel component of the cementitious composite material of the invention comprises a metal fiber component. The fibers generally have an average length of about 0.5 to about 5 millimeters, preferably 2 to 3 millimeters, and an average width or cross-section of about 10 to 250 microns, preferably about 50 to 150 microns. These are average dimensions. The fibers have a broad distribution of lengths and widths or cross-sections, such that up to about 20 percent of the fibers may be outside the above-mentioned ranges. Generally, the fiber lengths do not exceed about 20 millimeters and the widths or cross-sections are not more than about 300 microns. Too great a length of fiber inhibits vacuum integrity and interferes with the accurate casting of parts. Preferably, the fibers do not have a round cross-section but rather are somewhat flat, approaching a ribbon-like cross-section. Also, it is preferred that the fibers have a variable cross-section along the length of the fibers. This irregularity improves keying of the fibers into the matrix material. The modulus of the fibers should be high, preferably exceeding about $10 \times 10^6$ psi, preferably in excess of about $20 \times 10^6$ psi, to facilitate the mixing and flow characteristics of the material. High modulus fibers are particularly important in conjunction with the high strength matrix such as used in this invention, because a greater proportion of the load is transferred to the fibers. Moreover, high modulus minimizes excess of distortion in many of the fibers during mixing.

The fibers are preferably made of stainless steel, but other metals such as low carbon steel, tungsten and copper can be used. Mixtures of such fibers can be used and the fibers can be razor cut from a metal wire and chopped. The metal fibers can be produced as "steel wool" and chopped to the desired size. Chopped steel wool that is commercially available in short lengths (about 1 to 15 millimeters) can be used. Wires or ribbons of plain carbon steels like SAE 1020 are suitable. Another metal fiber is made depositing a molten metal on a rotating chilled metal wheel on which the metal solidifies in fibrous form and is removed from the wheel by a blade. This process is known as the melt extraction process. Fibers made by this method are manufactured by Ribbon Technology Corporation (RibTec).

The metal fiber component is generally employed in a proportion of about 5 to less than 30 weight percent based on the weight of the composite mixture of the invention, usually about 5 to about 25 weight percent, preferably about 5 to less than 20 weight percent and more preferably about 10 to less than 20 weight percent.

(b) Inorganic Aggregate Particles

A constituent of the cementitious composite material is an aggregate which enchances the strength and thermal properties, increases the compaction of the product, and controls the coefficient of thermal expansion. The aggregate comprises metal and other particles which are irregular in shape. Stainless steel and other steel particles can be used. Invar high nickel steel and silicon carbide are preferred when low coefficient of expansion is desired. Other aggregate particles include fused silica, cordierite and eucryptite. Mixtures of the various particles can be used.

Stainless steel particles of various sizes which can be used include 10/25 mesh, 80/100 mesh and 80/200 mesh (U.S. Standard Sieve sizes). Mixtures of stainless steel particles of various sizes can be employed. The predominant particle size range for the metal powders is greater than 200 mesh up to about 10/25 mesh. The preferred stainless steel powders are sold as Ancor 316L by Pfizer Corporation and are Type 316 Ni-Cr-Mo stainless steel particles having less than 0.03% carbon. These powders have a density of about 7.87 g/cm³.

The metal aggregate particles are employed in a proportion of about 30 to about 75 weight percent based on the weight of composite material of the invention, preferably about 35 to about 50 weight percent.

Table I gives a range of preferred proportions of the several ingredients in the mixture from which the composite of the invention is produced.

TABLE 1

| | (Percent By Weight) | |
| --- | --- | --- |
| | General | Preferred |
| Portland Cement | 20–35 | 24–26 |
| Chemically Active Silica | 2–7 | 3–4 |
| Inorganic Oxide | 5–25 | 10–12 |
| Water | 5–10 | 6–8 |
| Superplasticizer | 0.01–1.5 | 0.25–1.5 |
| Aggregate | 30–70 | 35–50 |
| Metal Fiber | 5–<30 | 10–<20 |

Mixing and Curing

The components of the compositions of the invention can be mixed and cured by procedures known in the art as exemplified by ASTM Procedure C305 for Mechanical Mixing of Hydraulic Cements (Part 5), and by the procedures disclosed in U.S. Pat. No. 4,482,385 and in Fibre Cements and Fibre Concrete, by D. J. Hannant, published in 1978 by John Wiley & Sons. The composites of the invention can be cured by lime curing processes and also by autoclave curing processes. Other processes and procedures can also be employed.

EXAMPLES

In the following examples and throughout this specification and claims, parts are by weight and temperatures are in degrees Celsius, unless indicated otherwise.

In these examples the vacuum integrity of the cured products was tested as follows: A bell jar was sealed to the surface of a flat, half-inch cement plate with an appropriate sealing strip such as GS213 seal strip. The bell jar is connected to a vacuum pump. The bell jar was evacuated to a pressure of 5 millimeters mercury or lower and pumped on at least 5 minutes. The valve to the vacuum pump was closed and the pressure in the bell jar was measured. After 15 minutes, the pressure of the bell jar was again measured. The pressure measurement after 15 minutes of holding was subtracted from the pressure measurement when the valve was first shut off. The leak rate was recorded as the pressure drop in 15 minutes.

EXAMPLE 1

The components listed in Table 2 for Example 1 were mixed to make a composition of the invention. The component designated as stainless steel fiber had the following characteristics:

| | |
| --- | --- |
| Average width (microns) | 53.0 |
| (range) | (18–107) |
| Average length (microns) | 2371 |
| (range) | (500–4000) |
| L/d | 45:1 |
| Bulk Density (g/cc) | 1.35 |

The components were carefully mixed in a mixer operated at high vacuum to minimize the presence of air bubbles in the resulting liquid mixture. The mix was cast into suitable molds and cured.

The cast specimens were placed in a high humidity chamber for 4 hours. The resulting specimens were treated in a saturated lime solution at 60° C. for 24 hours, after which the treated specimens were air dried for five days minimum and then cured at elevated temperatures in an oven.

The cured composites were tested for mechanical properties, vacuum integrity and thermal properties. The properties were measured at ambient temperature. The proportions are shown in Table 2 A, the properties are shown in Table 2 B, and are shown as measured at ambient temperatures.

EXAMPLES 2 to 4

In Examples 2 and 3, additional compositions of the invention were prepared and tested in accordance with Example 1. The compositions and results are shown in Tables 2 A, and 2 B. In Example 4, a composition in accordance with U.S. Pat. No. 4,482,385 was prepared and tested in accordance with Example 1. The composition and results are shown in Tables 2 A and 2 B.

TABLE 2

| | EXAMPLE NUMBER | | | |
| --- | --- | --- | --- | --- |
| | 1 | 2 | 3 | 4 (Control) |
| Components, Weight Percent | | | | |
| 316 Stainless Steel Powder (80/100 mesh) | — | — | — | 18.73 |
| 316 Stainless Steel Powder (80/200 Mesh) | 34.29 | 36.24 | 19.22 | — |
| 316 Stainless Steel Powder (10/25 Mesh) | — | — | 24.57 | 34.85 |
| 434 Stainless Steel Fiber | 17.14 | 15.13 | 9.61 | — |
| Portland Cement (Class H) | 24.69 | 24.66 | 24.16 | 24.31 |
| Fused Silica Particles (Grade 32I) | 12.15 | 12.13 | — | — |
| Min-U-Sil Silica Particles (5 micron) | — | — | 11.73 | 11.85 |
| Silica Fume | 3.42 | 3.42 | 3.29 | 3.32 |
| Mighty 100 Superplasticizer | 0.66 | 0.66 | 0.53 | 0.53 |
| Water | 7.66 | 7.77 | 6.89 | 6.41 |
| Water/Cement Ratio | 0.31 | 0.315 | 0.285 | 0.265 |
| Properties | | | | |
| Compressive Strength 24 hrs old, psi | 8,000 | 8,000 | 10,000 | 10,000 |
| After lime cure | 24,000 | 24,000 | 24,000 | 27,000 |
| After 150° C. cure | 39,000 | 38,000 | 47,000 | 45,000 |
| After 200° C. cure | 42,500 | 42,000 | 58,000 | 53,000 |

TABLE 2-continued

|  | EXAMPLE NUMBER | | | |
|---|---|---|---|---|
|  | 1 | 2 | 3 | 4 (Control) |
| Flexural Strength 24 hrs old, psi | 2,400 | 2,400 | 3,000 | 1,200 |
| After lime cure | 6,500 | 6,500 | 4,500 | 3,000 |
| After 150° C. cure | 7,500 | 7,500 | 6,600 | 4,600 |
| After 200° C. cure | 8,500 | 8,500 | 6,400 | 4,000 |
| Shrinkage 0 to 24 hrs, percent | 0.065 | 0.065 | 0.03 | 0.02 |
| After lime cure | 0.11 | 0.11 | 0.08 | 0.05 |
| After 150° C. cure | 0.22 | 0.23 | 0.18 | 0.16 |
| After 200° C. cure | 0.31 | 0.33 | 0.21 | 0.22 |
| Vacuum Integrity (Leak Rate Bell Jar Test) | | | | |
| After 150° C. cure, (mm/15 min) | 2 | 2 | 1.5 | 3 |
| After 200° C. cure, (mm/15 min) | 3 | 3 | 5 | 5 |
| After 350° C. cure, (mm/15 min) | 20 | 20 | — | 120 |

The composites of the invention as shown in Examples 1 to 3 had superior mechanical properties, particularly the flexural strength, when compared to the control material of Example 4. Further, the vacuum integrities of the composites of Examples 1 and 2 were about six times better than the control at 350° C. and above.

The mixture of Example 2 was found to cast more readily than the mixture of Example 1.

The product of Example 3 had the superior physical properties of Examples 1 and 2 and the excellent surface and shrinkage of the control product of Example 4.

Examples 5 to 8

Compositions of the invention were formulated as shown in Table 3 A to achieve high use temperatures. The 434 stainless steel fiber had the characteristics described in Example 1. The mixtures were prepared and cured as described in Example 1.

The composites were tested and the physical properties are shown in Tables 3 B and 3 C. The excellent performance of the composites of the invention at high temperatures is demonstrated by these data.

TABLE 3

|  | EXAMPLE NUMBER | | | |
|---|---|---|---|---|
|  | 5 | 6 | 7 | 8 |
| Components, Weight Percent | | | | |
| 316L Stainless Steel Aggregate 80/200 mesh | 34.55 | 33.63 | 28.9 | 39.32 |
| 434 Stainless Steel Fiber | 17.27 | 16.81 | 14.6 | 15.13 |
| Class H Portland Cement | 24.87 | 24.09 | 20.1 | 23.74 |
| Fused Silica, 32I | 12.24 | — | — | — |
| Calcined Alumina (—325 Mesh) | — | 12.04 | — | 11.83 |
| Zirconia (—325 mesh) | — | — | 26.1 | — |
| Silica Fume | 3.45 | 6.02 | 2.9 | 5.94 |
| Mighty 100 Superplasticizer | 0.66 | 0.66 | 0.6 | 0.65 |
| Water | 6.96 | 6.74 | 6.3 | 6.56 |
| Water/Cement Ratio | 0.28 | 0.28 | 0.30 | 0.28 |
| Physical Properties | | | | |
| Compressive Strength, psi | | | | |
| After Lime Cure and Air Dry | 25,000 | 25,000 | 25,000 | 25,000 |
| 150° C. cure | 40,000 | 41,000 | 27,000 | 42,000 |
| 200° C. cure | — | — | 41,000 | 45,000 |
| 210° C. cure | 49,000 | 47,000 | — | — |
| 350° C. cure | — | — | — | 52,000 |
| Flexural Strength, psi | | | | |
| After Lime Cure and Air Dry | 6700 | 6900 | 7,200 | 6,300 |
| 150° C. cure | 9300 | 8600 | 8,800 | 8,200 |
| 200° C. cure | — | — | 9,200 | 8,800 |
| 210° C. cure | 8700 | 9600 | — | — |
| 350° C. cure | 8600 | 10400 | 10,000 | 10,800 |
| 815° C. cure | 4100 | 5000 | — | — |
| Shrinkage (Assumes .06% initial set shrinkage), percent | | | | |
| After Lime Cure and Air Dry | 0.11 | 0.12 | 0.09 | 0.09 |
| 150° C. cure | 0.19 | 0.20 | 0.15 | 0.21 |
| 200° C. cure | — | — | 0.22 | 0.24 |
| 210° C. cure | 0.26 | 0.24 | — | — |
| 350° C. cure | 0.45 | 0.45 | 0.48 | 0.51 |
| 400° C. cure | 0.51 | 0.52 | — | — |
| 815° C. cure | 0.37 | 0.82 | — | — |
| Vacuum Integrity (Leak Rate Bell Jar Test) | | | | |
| 150° C. cure (mm/15 min) | 1.5 | 1.5 | 4 | 2 |
| 200° C. cure (mm/15 min) | 4 | 3 | 6 | 1 |
| 350° C. cure (mm/15 min) | 17 | 11 | 12 | 9 |

The data in Table 3 B show that the composite of Example 5 with fused silica reached a maximum flexural strength of 9300 psi after the 150° C. cure. Composites 6, 7 and 8 peaked in strength after the 350° C. cycle where values of 10,000 psi and over were achieved. The composites exhibited low shrinkage after the 350° C. cycle. Six inch square plates made with the composites of Examples 5 and 6 remained quite flat after the 350° C. cycle. Repeated cycling of composites 5 and 6 produced little additional dimensional change. These composites had very good vacuum integrities. All composites exhibited good flexural strengths after cycling to 815° C.

Examples 9–13

Four different metal fiber materials were used in making composites of the invention. In Example 9, a low carbon steel fiber was used. In Examples 10, 11 and 13, two grades of low carbon steel wool manufactured by Durawool, Inc. were used. In Example 12 was employed the 434 stainless steel fiber used in previous examples. In Example 13, -50 mesh iron filings were employed as aggregate. Certain characteristics of the fibers are shown in Table 4 A, together with the proportions of the components used in the respective examples. The composite mixtures were prepared as in Example 1 and then cured and tested as in Example 1. The resulting physical properties are shown in Tables 4 B.

it is found that the 434 stainless steel fibers of Example 12 perform best. These fibers yield a mixture with flexural strength in excess of 8,000 psi, lowest shrinkage and the best vacuum integrity. However, the Durawool fibers of Examples 10 and 11 were close to the stainless steel in performance.

Examples 14–17

Additional fibers were used in compositions of the invention in Examples 14–17. In Example 14 was employed a fine, low carbon steel (1012) fiber identified as Durawool Grade 1-BV65. (BV65 stands for bulk volume - 65 milliliters for 100 grams of fibers.) Example 15 employed a coarse, low carbon steel fiber labeled Durawool grade 3L-BV70. (BV stands for bulk volume - 70 milliliters for 100 grams of fibers.) A mixture of these two fibers was employed in Example 16. In Example 17 was employed a very coarse 430 stainless fiber which

TABLE 4

| | EXAMPLE NUMBER | | | | |
|---|---|---|---|---|---|
| Fiber Type | 9<br>Carbon<br>Steel | 10<br>Durawool-1<br>Carbon<br>Steel | 11<br>Durawool-3L<br>Carbon<br>Steel | 12<br>434<br>Stainless<br>Steel | 13<br>Durawool-3L<br>Carbon<br>Steel |
| Fiber Characteristics: | | | | | |
| Average width (micron)<br>(variance) | 32.6<br>(13–65) | Fine | Coarse | 53.0<br>(18–107) | Coarse |
| Average Length (micron)<br>(standard dev.) | 1061<br>(754) | Not Measured | Not Measured | 2371<br>(1679) | Not Measured |
| L/d | 33:1 | Not Measured | Not Measured | 45:1 | Not Measured |
| Bulk Density (g/cc) | 0.95 | 1.04 | 1.07 | 1.35 | 1.07 |
| Components, weight percent | | | | | |
| Fiber | 10.51 | 17.19 | 17.19 | 17.19 | 16.13 |
| Stainless Steel Powder (80/200 mesh) | — | — | — | 34.47 | — |
| Stainless Steel Powder (80/100 mesh) | 41.05 | 34.37 | 34.37 | — | — |
| Iron Filings (−50 mesh) | — | — | — | — | 38.40 |
| Class H Portland Cement | 24.75 | 24.75 | 24.75 | 24.75 | 23.23 |
| Fused Silica (32I) | 12.18 | 12.18 | 12.18 | 12.18 | 11.43 |
| Silica Fume | 3.44 | 3.44 | 3.44 | 3.44 | 3.23 |
| Mighty 100 | 0.66 | 0.66 | 0.66 | 0.66 | 0.63 |
| Water | 7.41 | 7.41 | 7.41 | 7.41 | 6.96 |
| Water/Cement Ratio | .30 | .30 | .30 | .30 | .30 |
| Properties of Composites: | | | | | |
| Compressive Strength (psi) | | | | | |
| Standard Cure | 26,000 | 26,000 | 28,000 | 25,000 | 25,000 |
| 150° C. Cure | 39,000 | 36,000 | 37,000 | 40,000 | 39,000 |
| 200° C. Cure | 44,000 | 43,000 | 47,000 | 45,000 | 44,000 |
| Flexural Strength (psi) | | | | | |
| Standard Cure | — | 5700 | 4700 | 5500 | 5700 |
| 150° C. Cure | 6300 | 7100 | 6500 | 7500 | 7300 |
| 200° C. Cure | 6900 | 7800 | 7100 | 8500 | 7500 |
| Vacuum Integrity (mm/15 min) | | | | | |
| 150° C. Cure | 1.5 | 2 | 4 | 1 | 6.5 |
| 200° C. Cure | — | 5.5 | 16 | 2 | 20 |
| Shrinkage (Assumes 0.06% initial set shrinkage), percent | | | | | |
| 0–24 hours | — | — | — | 0.06 | — |
| Lime Cure | 0.13 | 0.11 | — | 0.08 | 0.09 |
| Air Dry | 0.15 | 0.13 | 0.14 | 0.12 | 0.11 |
| 150° C. Cure | 0.25 | 0.20 | 0.22 | 0.19 | 0.22 |
| 200° C. Cure | 0.35 | 0.31 | 0.31 | 0.27 | 0.29 |

When one considers the strength, shrinkage and vacuum integrity of the composite mixes of Examples 9–13, had a high bulk density. Characteristics of the various fibers are shown in Table 5 A.

TABLE 5A

| | EXAMPLE NUMBER | | | |
|---|---|---|---|---|
| Fiber Type | 14<br>Durawool Grade 1<br>BV65, 1012 Steel | 15<br>Durawool Grade 3L<br>BV70, 1012 Steel | 16<br>Mixture<br>Durawool<br>Grades 1 & 3L | 17<br>RibTec<br>430 Stainless<br>Steel |
| Fiber Characteristics: | | | | |
| Width | Fine | Coarse | | Very Coarse<br>(110–250 microns) |

TABLE 5A-continued

| Fiber Type | EXAMPLE NUMBER | | | |
|---|---|---|---|---|
| | 14<br>Durawool Grade 1<br>BV65, 1012 Steel | 15<br>Durawool Grade 3L<br>BV70, 1012 Steel | 16<br>Mixture<br>Durawool<br>Grades 1 & 3L | 17<br>RibTec<br>430 Stainless<br>Steel |
| Length | — | — | | 2.3 ± 1.6 mm |
| Bulk Density | 1.35 g/cc | 1.35 g/cc | | 2.0 g/cc |

The foregoing fibers were mixed with other components in accordance with the invention in the proportions shown in Table 9.

TABLE 5B

| Component | Weight Percent |
|---|---|
| 316 Stainless Steel Powder (80/200 mesh) | 34.37 |
| Fibers | 17.18 |
| Class H Portland Cement | 24.75 |
| Fused Silica | 12.18 |
| Silica Fume | 3.44 |
| M-100 Superplasticizer | 0.67 |
| Water | 7.41 |

The components of Examples 14-17 were mixed, cured and tested in accordance with Example 1. The resulting properties are shown in Table 5 C.

TABLE 5C

| | EXAMPLE NUMBER | | | |
|---|---|---|---|---|
| | 14<br>Durawool<br>Grade 1<br>BV65, 1012 Steel | 15<br>Durawool<br>Grade 3L<br>BV70, 1012 Steel | 16<br>Mixture<br>Durawool<br>Grades<br>1 & 3L | 17<br>RibTec<br>430<br>Stainless<br>Steel |
| Properties of Cured Composite | | | | |
| Density g/cc | 3.46 | 3.46 | 3.51 | 3.51 |
| Compressive Strength, psi | | | | |
| Thru Air Dry | 23,000 | 22,000 | 23,000 | 25,000 |
| 150° C. Cure | 35,000 | 35,000 | 36,000 | 34,000 |
| 200° C. Cure | 43,000 | 44,000 | 44,000 | 39,000 |
| Flexural Strength, psi | | | | |
| Thru Air Dry | 4500 | 5800 | 4400 | 5800 |
| 150° C. Cure | 6800 | 6700 | 7500 | 7000 |
| 200° C. Cure | 8000 | 8000 | 7200 | 7900 |
| Shrinkage (Assumes 0.06% initial set shrinkage), percent | | | | |
| Thru Air Dry | 0.13 | 0.13 | 0.13 | 0.12 |
| 150° C. Cure | 0.19 | 0.20 | 0.19 | 0.21 |
| 200° C. Cure | 0.30 | 0.30 | 0.29 | 0.28 |
| Vacuum Integrity (Leak Rate, mm/15 min) | | | | |
| 150° C. Cure | 4 | 2.5 | — | 3 |
| 200° C. Cure | 4.5 | 4 | 5.5 | 5.5 |

In Examples 14-17, it was found that the coarser fibers generally resulted in better consistency of the mix, than the finer fibers. Moreover, the higher bulk density fibers gave mixes with better consistency than the lower bulk density materials. Additionally, the higher bulk density fibers gave products with better vacuum integrity and better flexural strength.

EXAMPLE 18

A different type of RibTec fiber was used in the composition of the invention in Example 18. This fiber has the following characteristics:

| Width | 100 microns |
|---|---|
| (Range | 50–200 microns) |
| Length | 3 millimeters |
| (Range | 1–6 millimeters) |
| Bulk density | 2.0 g/cc |

The fiber was mixed with other components in accordance with the invention in the proportions shown in Table 6.

TABLE 6

| Components, weight percent | |
|---|---|
| 316L Stainless Steel Powder (80/200 mesh) | 40.54 |
| −50/+100 RibTec Fiber | 14.55 |
| Class H Cement | 22.95 |
| Fused Silica | 11.28 |
| Calcined Alumina (−325) | — |
| Silica Fume | 3.18 |
| Mighty 100 Superplasticizer | 0.61 |
| Water | 6.88 |
| Water/Cement Ratio | 0.30 |
| Properties of Composite | |
| Compressive Strength (psi) | |
| After lime cure and air dry | 21,000 |
| 150° C. cure | 30,000 |
| 200° C. cure | 40,000 |
| 350° C. cure | 34,000 |
| Flexural Strength (psi) | |
| After lime cure and air dry | 6900 |
| 150° C. cure | 9000 |
| 200° C. cure | 9000 |
| 350° C. cure | 5800 |
| Vacuum Integrity | |
| 150° C. cure (mm/15 min) | 7 |
| 200° C. cure (mm/15 min) | 15 |
| 350° C. cure (mm/15 min) | 63 |
| Shrinkage 0–24 hrs (percent) | |
| (Assumes 0.06% initial set shrinkage) | |
| Steam cure | 0.09 |

TABLE 6-continued

| | |
|---|---|
| Air Cure | 0.11 |
| 150° C. cure | 0.20 |
| 200° C. cure | 0.31 |
| 350° C. cure | 0.41 |

The components of Example 18 were mixed, cured and tested in accordance with Example 1. The resulting properties are shown in Table 6. The composite of Example 18 exhibited better consistency with lower water content; lower shrinkage after curing at 150° C.; higher flexural strength from the cures at 150 and 200° C.; and better toughness and elongation at break.

EXAMPLES 19–21

Compositions of the invention having a very low coefficient of thermal expansion were prepared using as the aggregate component Invar 36 high nickel steel in Examples 19 and 20, and silicon carbide in Example 21. The foregoing aggregates were mixed with other components in accordance with the invention in the proportions shown in Table 7 A.

The components of Examples 19, 20 and 21 were mixed, cured and tested in accordance with Example 1. The resulting properties are shown in Table 7 B.

The results of Examples 19, 20 and 21 show that the coefficient of thermal expansion can be controlled through proper selection of aggregate. Also lower shrinkage was obtained.

EXAMPLES 22 and 23

A polymeric additive was employed in Examples 22 and 23 in the proportion shown in Table 8. The additive was an acrylic polymer latex designated Akro 7T Latex by the manufacturer TAMMS Industries Company. The latex contained 50 weight percent solids in water. The proportions shown include the water. The composition was mixed and cured as shown in Example 1. The resulting composites had the properties shown in Table 8.

TABLE 7

| | EXAMPLE NUMBER | | |
|---|---|---|---|
| | 19 Invar 36/434 Fiber | 20 Invar 36/434 Fiber | 21 SiC/434 Fiber |
| Components, weight percent | | | |
| Invar 36 Steel (80/100 mesh) | 42.4 | 51.5 | — |
| Silicon Carbide (100/200 mesh) | — | — | 31.1 |
| 434 Stainless Steel Fiber | 16.5 | 11.5 | 14.2 |
| Class H Portland cement | 21.27 | 19.08 | 28.21 |
| Fused Silica | 10.47 | 9.39 | 13.88 |
| Silica Fume (Grade 32I) | 2.95 | 2.65 | 3.91 |
| Mighty 100 Superplasticizer | 0.58 | 0.51 | 0.75 |
| Water | 5.98 | 5.34 | 7.34 |
| Water/Cement Ratio | 0.28 | 0.28 | 0.26 |
| Properties of Composite | | | |
| Density, g/cc | 3.89 | 4.13 | 2.83 |
| Coefficient of thermal expansion | $3.1 \times 10^{-6}/°F.$ | $2.7 \times 10^{-6}/°F.$ | $3.05 \times 10^{-6}/°F.$ |
| Compressive Strength, psi | | | |
| After lime cure and air dry | 28,000 | 26,000 | 27,000 |
| 150° C. cure | 37,000 | 41,000 | — |
| 200° C. cure | 47,000 | 46,000 | 38,000 |
| 350° C. cure | — | — | — |
| Flexural Strength, psi | | | |
| After lime cure and air dry | 6,300 | 6,500 | 6,200 |
| 150° C. cure | 7,200 | 7,300 | — |
| 200° C. cure | 8,700 | 8,500 | 7,400 |
| 350° C. cure | — | — | 6,100 |
| Shrinkage (Assumes 0.06% initial set shrinkage), percent | | | |
| After lime cure and air dry | .11 | .10 | .09 |
| 150° C. cure | .18 | .18 | — |
| 200° C. cure | .26 | .22 | .17 |
| 350° C. cure | — | — | .30 |
| Vacuum Integrity | | | |
| 150° C. cure (mm/15 min) | 2.5 | 2 | 2 |
| 200° C. cure (mm/15 min) | 4 | 4 | 16 |
| 350° C. cure (mm/15 min) | — | — | 30 |

TABLE 8

| | EXAMPLE NUMBER | |
|---|---|---|
| | 22 | 23 |
| Components, weight percent | | |
| 434 Stainless Steel Fiber | 12.09 | 16.92 |
| 316L Stainless Steel Powder (80/200 mesh) | 38.66 | 33.83 |
| Class H Portland Cement | 24.36 | 24.36 |
| Fused Silica | 11.98 | 11.98 |
| Silica Fume | 3.38 | 3.38 |
| Mighty 100 Superplasticizer | 0.65 | 0.65 |
| Akro 7T Latex | 5.75 | 5.75 |
| Water | 3.12 | 3.12 |
| Water/Cement | 0.25 | 0.25 |
| Properties of Composite | | |
| Compressive Strength (psi) | | |
| After lime cure and air dry | 23,000 | 21,000 |
| 150° C. cure | 34,000 | 35,000 |
| 200° C. cure | 41,000 | 38,000 |
| Flexural Strength (psi) | | |
| After lime cure and air dry | 4,400 | 6,200 |
| 150° C. cure | 7,100 | 7,100 |
| 200° C. cure | 7,200 | 8,100 |
| Shrinkage 0–24 hrs (percent) (Assumes 0.06% initial set shrinkage) | | |
| After lime cure and air dry | 0.15 | 0.12 |
| 150° C. cure | 0.21 | 0.15 |
| 200° C. cure | 0.28 | 0.24 |

The composite mixes of the invention have a very low void content. Segregation of the components is minimal. The compositions of the invention have very good dimensional stability, particularly when dried at high temperature. The composite mixes of the invention can be cured to products having unexpectedly high strengths, and especially at high temperatures up to 450° C. The products of the invention generally have better vacuum integrity, particularly at temperatures between 200° and 450° C. The cured products have better crack resistance and toughness. These products machine better with a better surface finish. The coefficient of thermal expansion can be controlled in the products of the invention.

What is claimed is:

1. A cementitious composite material which when cured has high strength and high degree of vacuum integrity at high temperatures, comprising
   (1) a high strength cement matrix which when cured has a compressive strength of at least about 15,000 psi and a flexural strength of at least about 1500 psi, and
   (2) a filler component comprising a metal fiber having a length of about 0.5 to about 5 millimeters,
   wherein the metal fiber is present in said composite material in a proportion from about 5 to less than 20 weight percent of the weight of the composite material.
2. The composite material of claim 1 wherein the cement matrix comprises silica-based cement.
3. The composite material of claim 1 wherein the cement matrix comprises Portland cement.
4. The composite material of claim 3 wherein the cement matrix comprises API Class H Portland cement.
5. The composite material of claim 1 wherein the cement matrix comprises high alumina cement.
6. The composite material of claim 1 wherein the cement matrix comprises phosphate-modified cement.
7. The composite material of claim 1 wherein the cement matrix comprises polymer-treated cement.
8. The composite material of claim 1 wherein the cement matrix comprises cement formed of ceramic oxides.
9. The composite material of claim 1 wherein the cement matrix comprises a hydraulic cement which has been mixed with small amounts of an aqueous polymer using high shear mixing.
10. The composite material of claim 1 wherein the cement matrix comprises a mixture containing a tobermorite-like gel.
11. The composite material of claim 1 wherein the metal fiber is present in said composite material in a proportion from about 10 to less than 20 weight percent of the composite material.
12. The composite material of claim 1 wherein the metal fiber component is stainless steel.
13. The composite material of claim 1 wherein the metal fiber component is low carbon steel.
14. The composite material of claim 1 wherein the metal fiber component is chopped steel wool.
15. The composite material of claim 3 comprising stainless steel aggregate and stainless steel fibers.
16. The composite material of claim 15 comprising about 30 to about 70 weight percent of stainless steel aggregate.
17. The composite material of claim 16 wherein the stainless steel aggregate has a particle size of greater than 200 mesh.
18. The composite material of claim 17 wherein the stainless steel fibers have a length of about 0.5 to about 5 millimeters and a width or diameter of about 10 to about 250 microns.
19. The composite material of claim 15 comprising chemically reactive silica particles.
20. The composite material of claim 19 comprising inorganic oxide particles.
21. A mixture from which objects of a cementitious composite material can be cast, said mixture comprising:
   (a) Portland cement,
   (b) chemically reactive silica particles,
   (c) inorganic oxide particles,
   (d) aggregate particles,
   (e) metal fibers, and
   (f) water.
22. The mixture of claim 21 in which the constituents are present in the following relative proportions in percent by weight of the mixture:
   (a) Portland cement—20 to 35 percent,
   (b) chemically reactive silica particles—2 to 10 percent,
   (c) inorganic oxide particles—5 to 25 percent,
   (d) aggregate—30 to 70 percent,
   (e) metal fibers—5 to 25 percent, and
   (f) water—5 to 10 percent.
23. The mixture of claim 21 wherein the Portland cement is API Class H.
24. The mixture of claim 21 in which the inorganic oxide particles comprise particles of a vitreous, glassy form of silica.
25. The mixture of claim 21 in which the inorganic oxide particles comprise particles of crystalline silica or quartz.
26. The mixture of claim 21 wherein the inorganic oxide particles comprise particles of alumina.
27. The mixture of claim 21 wherein the inorganic oxide particles comprise particles of zirconia.
28. The mixture of claim 21 which comprises low carbon steel fibers and stainless steel aggregate.
29. The mixture of claim 21 which comprises low carbon steel fibers and 80/100 mesh stainless steel aggregate.
30. The mixture of claim 21 which comprises low carbon steel fibers and 80/200 mesh stainless steel aggregate.
31. The mixture of claim 21 wherein the chemically reactive silica particles comprise silica fume particles.
32. A mixture from which objects of a cementitious composite material can be cast, said mixture comprising:
   (a) Portland cement,
   (b) chemically reactive silica particles,
   (c) silica particles that differ from particles (b),
   (d) irregularly shaped aggregate particles,
   (e) stainless steel fibers, and
   (f) water.
33. The mixture of claim 32 in which the constituents are present in the following relative proportions in percent by weight of the mixture:
   (a) Portland cement—20 to 35 percent,
   (b) chemically reactive silica—2 to 10 percent,
   (c) silica particles—5 to 25 percent,
   (d) aggregate—30 to 70 percent,
   (e) stainless steel fibers—5 to 25 percent, and
   (f) water—5 to 10 percent.

34. The mixture of claim 32 wherein the Portland cement is API Class H.

35. The mixture of claim 32 in which the silica particles comprise particles of a vitreous, glassy form of silica.

36. The mixture of claim 32 in which the silica particles comprise particles of crystalline silica or quartz.

37. The mixture of claim 32 in which the aggregate comprises stainless steel aggregate.

38. The mixture of claim 32 wherein the stainless steel aggregate has a particle size of greater than 200 mesh.

39. The mixture of claim 32 in which the aggregate comprises 80/200 mesh stainless steel aggregate.

40. The mixture of claim 32 in which the aggregate comprises 80/100 mesh stainless steel aggregate.

41. The mixture of claim 32 in which the aggregate comprises 80/200 mesh stainless steel aggregate and 10/25 mesh stainless steel aggregate.

42. The mixture of claim 32 wherein the aggregate comprises high nickel steel aggregate.

43. The mixture of claim 32 wherein the aggregate comprises silicon carbide aggregate.

44. The mixture of claim 32 wherein the stainless steel fibers have a length of about 0.5 to about 5 millimeters and a width or cross-section of about 10 to about 250 microns.

45. The mixture of claim 32 wherein the chemically reactive silica particles comprise silica fume particles.

46. A mixture from which objects of a cementitious composite material may be cast, said mixture comprising:
(a) Portland cement,
(b) chemically reactive silica fume particles,
(c) silica particles that are less chemically reactive and which are larger than particles (b),
(d) a superplasticizer,
(e) an irregularly shaped stainless steel aggregate,
(f) stainless steel fibers, and
(g) water.

47. The mixture of claim 46 in which the constituents are present in the following relative proportions in percent by weight of the mixture:
(a) Portland cement—24 to 26 percent,
(b) chemically reactive silica fume—3 to 4 percent,
(c) less reactive silica particles—10 to 12 percent,
(d) superplasticizer—0.25 to 1.5 percent,
(e) stainless steel aggregate—35 to 50 percent,
(f) stainless steel fibers—5 to less than 20 percent, and
(g) water—6 to 8 percent.

48. The mixture of claim 46 wherein the Portland cement is API Class H.

49. The mixture of claim 47 wherein the stainless steel fibers have a length of about 2 to 3 millimeters and a width or cross-section of about 50 to about 150 microns.

50. The mixture of claim 46 wherein the superplasticizer is sodium salt of formaldehyde condensate of naphthalene beta sulfonic acid 51. An object produced by curing the composite material of claim 1.

52. An object produced by curing the mixture of claim 21.

53. An object produced by curing the mixture of claim 32.

54. An object produced by curing the mixture of claim 46.

55. A mold produced by curing the mixture of claim 1.

56. A mold produced by curing the mixture of claim 21.

57. A mold produced by curing the mixture of claim 32.

58. A mold produced by curing the mixture of claim 46.

59. The mixture of claim 21 wherein the metal fiber comprises chopped steel wool.

60. An object produced by during the mixture of claim 59.

* * * * *